United States Patent [19]

Meek

[11] Patent Number: 5,745,564
[45] Date of Patent: Apr. 28, 1998

[54] ECHO CANCELLING ARRANGEMENT

[75] Inventor: Quentin James Meek, Gloucester, Canada

[73] Assignee: Northern Telecom Limited, Montreal, Canada

[21] Appl. No.: 378,335

[22] Filed: Jan. 26, 1995

[51] Int. Cl.$^6$ .................................................... H04M 9/00
[52] U.S. Cl. ........................ 379/410; 379/406; 379/411; 370/32.1
[58] Field of Search ...................... 379/406, 408, 379/409, 410, 407, 345, 411, 402; 370/32.1, 110.1

[56] References Cited

U.S. PATENT DOCUMENTS

| | | | |
|---|---|---|---|
| 4,360,712 | 11/1982 | Horna | 379/406 |
| 5,153,875 | 10/1992 | Takatori | 370/32.1 |
| 5,237,562 | 8/1993 | Fujii et al. | 379/411 |
| 5,278,900 | 1/1994 | Van Gerwen et al. | 379/390 |
| 5,283,784 | 2/1994 | Genter | 379/410 |
| 5,307,405 | 4/1994 | Sih | 379/410 |
| 5,577,097 | 11/1996 | Meek | 379/411 |

FOREIGN PATENT DOCUMENTS

| | | |
|---|---|---|
| 0627840 | 12/1994 | European Pat. Off. ............... 379/410 |
| 627840 A2 | 12/1994 | European Pat. Off. ............... 379/410 |
| 58-179035 | 10/1983 | Japan . |
| 02090819 | 3/1990 | Japan . |
| 02174353 | 7/1990 | Japan . |
| 05304493 | 11/1993 | Japan . |

*Primary Examiner*—Harry S. Hong
*Assistant Examiner*—Jacques M. Saint-Surin
*Attorney, Agent, or Firm*—R. John Haley

[57] ABSTRACT

In an echo canceller, an estimated echo signal is produced by an adaptive filter from a receive path signal and is subtracted from an incoming transmit path signal to produce an outgoing transmit path signal. Averages of signal levels on the receive path and the incoming and outgoing transmit paths are produced by exponential averaging. Adaptation of the adaptive filter is inhibited after initial convergence. Adaptation is enabled again in response to an echo attenuation parameter being less than a first threshold value and a variation of an echo attenuation parameter being less than a second threshold value, this situation representing a detected echo path change. The detection of an echo path change is inhibited in the presence of a near end signal. The echo attenuation parameters can be either or both of the ERLE (echo return loss enhancement) due to the subtraction of the estimated echo signal or the combined attenuation of the ERLE plus the ERL (echo return loss) of the hybrid circuit, these parameters being determined from averaged signal levels on the signal paths.

27 Claims, 2 Drawing Sheets

ECHO CANCELLING ARRANGEMENT

This invention relates to echo cancelling arrangements, and is particularly concerned with the detection of echo path changes in an echo cancelling arrangement.

BACKGROUND OF THE INVENTION

As is well known, four-wire and two-wire communications paths are commonly coupled by a hybrid circuit. Due to imperfect balancing of the hybrid circuit, a component of a signal incoming on the four-wire receive path, referred to as an echo signal, is inevitably but undesirably coupled to the four-wire transmit path, with an attenuation which is referred to as the echo return loss, or ERL.

In order to cancel the echo signal, it is well known to provide an echo canceller which comprises an adaptive filter and a subtraction unit. The adaptive filter is supplied with the signal incoming on the four-wire receive path and produces an estimated echo signal, which the subtraction unit subtracts from the signal incoming on the four-wire transmit path to produce an outgoing four-wire transmit path signal which includes a residual echo signal. The adaptive filter is adapted in dependence upon the residual echo signal in a manner which seeks to reduce the residual echo signal to zero, i.e. in such a manner that the estimated echo signal corresponds exactly to the actual echo signal coupled via the hybrid circuit.

Two echo attenuation parameters which are associated with an echo cancelling arrangement are the echo return loss enhancement or ERLE, and the combined attenuation Acom. The ERLE is the degree to which the echo canceller suppresses the echo signal, i.e. the ratio of the echo signal to the residual echo signal. The combined attenuation is the sum of the ERL and the ERLE, and thus is the total attenuation of a received signal from the receive path to the outgoing transmit path.

As is also well known, it is necessary to inhibit adaptation of the adaptive filter whenever there is a so-called near end signal present, such a signal being coupled from the two-wire path to the four-wire transmit path, because such a signal constitutes noise as far as the convergence of the echo canceller is concerned. It is therefore common to provide a so-called double-talk detector which detects the presence of a near-end signal, or simultaneously-occurring signals in both directions of transmission, adaptation of the adaptive filter being inhibited in response to such detection.

A double-talk detector typically monitors the average signal levels on the four-wire receive path and on the four-wire transmit path prior to the subtraction unit, and determines a double-talk condition, i.e. that a near end signal is present, if the latter average signal level exceeds the former average signal level reduced by the ERL, which is typically assumed to be a fixed value of 6dB.

A problem with known echo cancelling arrangements is that double-talk detection is difficult and not instantaneous. Consequently, there are periods of time during which adaptation of the adaptive filter occurs even in the presence of double-talk. As a result, the adaptive filter coefficients initially diverge from their desired, or converged, values, are then frozen during continued double-talk when this has been detected, and re-converge when the near end signal is no longer present. This variation in the adaptive filter response has the disadvantage of producing audible and undesired echo bursts at the start and end of double-talk situations.

In order to improve echo canceller performance, Horna U.S. Pat. No. 4,360,712 issued Nov. 23, 1982 and entitled "Double Talk Detector For Echo Cancellers" describes an arrangement using three double-talk detectors in combination with an echo canceller having an adaptive filter and a center clipper. Two of the double-talk detectors are used in the presence of double-talk to selectively freeze the adaptive filter correction loop and to disable the center clipper, and the third double-talk detector is used to detect the initial adaptive period of the echo canceller. This patent does not address the problem and disadvantage described above.

In addition, Takatori U.S. Pat. No. 5,153,875 issued Oct. 6, 1992 and entitled "Adaptive Balancing Network" describes an arrangement in which the coefficients of an adaptive filter of an echo canceller are frozen for the remainder of a connection following an initial adaptation period. Such an arrangement does not permit any re-convergence of the echo canceller in response to an echo path change which may occur during the connection, for example in response to a change in the hook state of an extension telephone.

An object of this invention is to provide a method of detecting echo path changes, and an echo cancelling arrangement, in which the above disadvantages of known echo cancelling arrangements are avoided or reduced.

SUMMARY OF THE INVENTION

According to one aspect of this invention there is provided a method of detecting echo path changes in an echo cancelling arrangement in which an estimated echo signal is produced from a receive path signal and is subtracted from an incoming transmit path signal to produce an outgoing transmit path signal, comprising the steps of: monitoring signal levels on said paths; determining from the monitored signal levels when a first echo attenuation parameter of the echo cancelling arrangement is less than a first threshold value; determining from the monitored signal levels when a variation of a second echo attenuation parameter of the echo cancelling arrangement is less than a second threshold value; and detecting that an echo path has changed in response to determinations that the first echo attenuation parameter is less than the first threshold value and that the variation of the second echo attenuation parameter is less than the second threshold value.

Preferably at least one of the first and second echo attenuation parameters comprises combined attenuation from the receive path to the outgoing transmit path and is determined from the monitored signal levels on the receive path and the outgoing transmit path. Instead, or in addition, at least one of the first and second echo attenuation parameters can comprise ERLE (echo return loss enhancement) due to the subtraction of the estimated echo signal and is determined from the monitored signal levels on the incoming and outgoing transmit paths. Thus the first and second echo attenuation parameters can be the same or different, and either of them can be the combined attenuation Acom or the ERLE.

Conveniently, the step of determining from the monitored signal levels when a variation of the second echo attenuation parameter is less than a second threshold value comprises forming a ratio of a maximum value to a minimum value of the second echo attenuation parameter. The step of monitoring signal levels on said paths preferably includes averaging signal levels on the receive path and the incoming and outgoing transmit paths, desirably using exponential averaging.

In order to avoid any erroneous detection that an echo path has changed, in the presence of a strong near end signal which can result in a small variation of the second attenuation parameter, the method preferably further comprises the step of inhibiting detection that an echo path has changed in response to a difference between the monitored signal levels on the receive and incoming transmit paths being less than a predetermined amount, for example 6dB corresponding to a minimum value of ERL.

According to another aspect of this invention there is provided a method of controlling an echo cancelling arrangement in which an estimated echo signal is produced by an adaptive filter from a signal on a receive path and is subtracted from a signal on an incoming transmit path to produce a signal on an outgoing transmit path, comprising the steps of: monitoring convergence of the echo canceller; inhibiting adaptation of the adaptive filter in response to convergence of the echo canceller to a predetermined extent; and subsequently enabling adaptation of the adaptive filter in response to a first echo attenuation parameter of the echo cancelling arrangement being less than a first threshold value and a variation of a second echo attenuation parameter of the echo cancelling arrangement being less than a second threshold value.

Thus, in accordance with this invention, variation in either the ERLE or the combined attenuation Acom, which is the sum of ERL and ERLE, is used together with the measured combined attenuation Acom or ERLE to determine when there is an echo path change, as distinct from a double-talk situation. As double-talk situations occur far more commonly than echo path changes, and adaptation of the adaptive filter in response to these gives rise to the undesired echo bursts discussed in relation to the prior art, adaptation of the adaptive filter is inhibited except for initial convergence of the echo canceller and in response to detection of an echo path change. The convergence of the echo canceller can also be monitored from either the ERLE or the combined attenuation Acom.

The invention also extends to an echo cancelling arrangement for coupling to a four-wire communications path which is coupled via a hybrid circuit to a two-wire communications path, for cancelling an echo signal coupled via the hybrid circuit from a receive path of the four-wire path to a transmit path of the four-wire path, the arrangement comprising: an adaptive filter having an input coupled to the receive path and an output for an estimated echo signal; a subtraction unit in the transmit path for subtracting the estimated echo signal from a signal on the transmit path; and apparatus for determining variation of a ratio, of signal levels on the receive path or the transmit path before the subtraction unit to signal levels on the transmit path after the subtraction unit, and for comparing the variation with a threshold value for use in controlling adaptation of the adaptive filter.

The arrangement preferably includes: averaging apparatus for producing averages Ra, Sa, and Ta of signal levels on the receive path and on the transmit path before and after the subtraction unit, respectively; apparatus for determining at least one of ratios Sa/Ta and Ra/Ta; and apparatus for inhibiting adaptation of the adaptive filter in response to one of said ratios being greater than a predetermined amount; wherein the apparatus for determining and for comparing the variation is arranged for enabling adaptation of the adaptive filter in response to one of said ratios being less than a first threshold value and the variation of one of said ratios being less than a second threshold value. The apparatus for determining variation conveniently comprises apparatus for forming a ratio of a maximum value to a minimum value of one of said ratios for comparison with the second threshold value.

The arrangement preferably further includes a detector for inhibiting adaptation of the adaptive filter in response to a difference between the signal levels on the receive path and on the transmit path before the subtraction unit being less than a predetermined amount.

Preferably the apparatus for determining variation of a ratio is arranged to determine variation of a ratio of signal levels on the receive path to signal levels on the transmit path after the subtraction unit.

BRIEF DESCRIPTION OF THE DRAWING

The invention will be further understood from the following description with reference to the accompanying drawing, in which.

DETAILED DESCRIPTION

Figure 1:
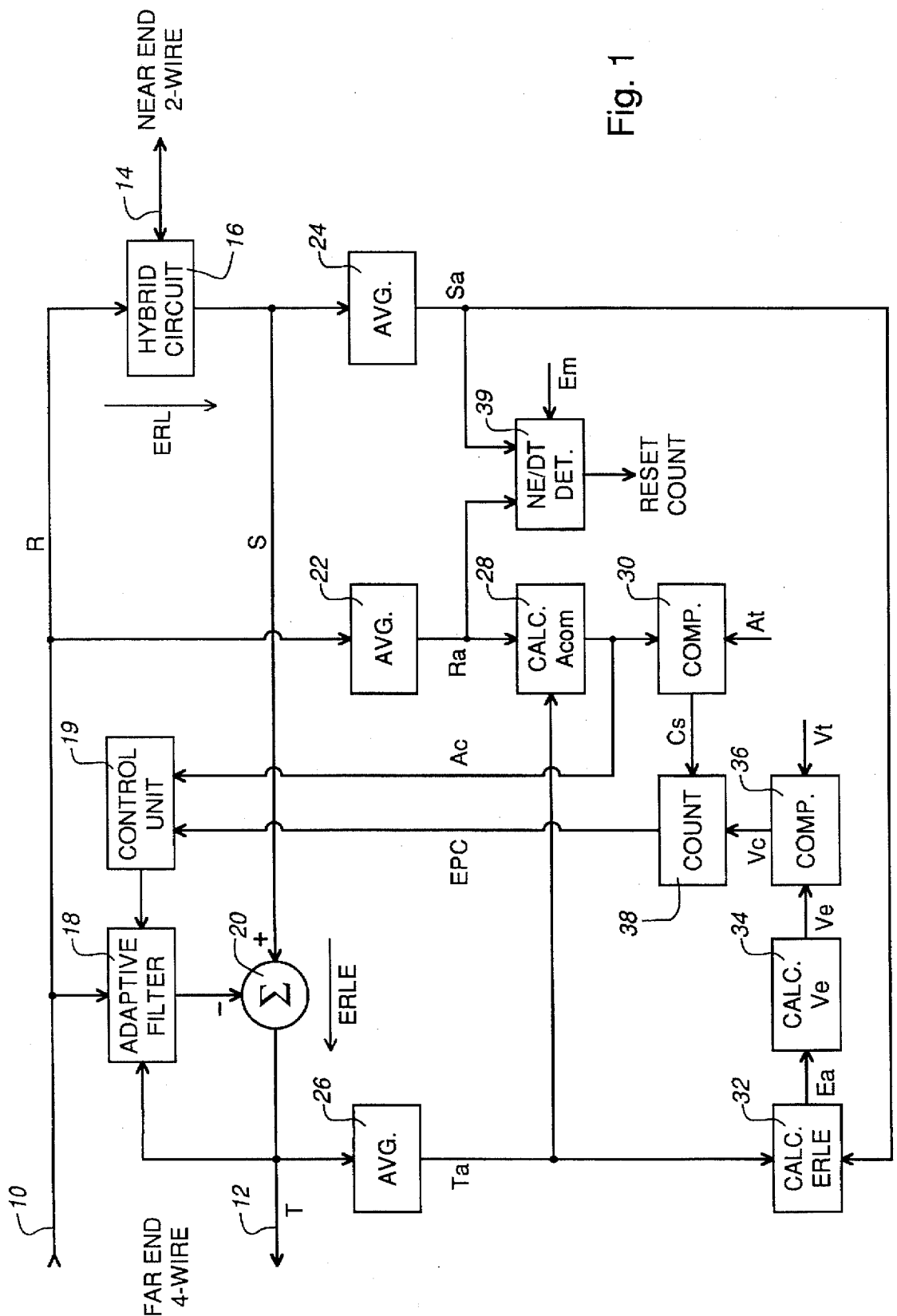
FIG. 1 illustrates an echo cancelling arrangement in accordance with a preferred embodiment of the invention.

Referring to FIG. 1, a four-wire communications path, comprising a receive path 10 and a transmit path 12, is coupled to a bidirectional two-wire communications path 14 via a hybrid circuit 16. An echo cancelling arrangement includes an adaptive filter 18, an adaptation control unit 19, and a subtraction unit 20. A far end signal, typically a voice signal, incoming on the receive path 10 as a signal R is supplied to the hybrid circuit 16, to be coupled to the two-wire path 14, and to an input of the adaptive filter 18. Near end signals incoming via the two-wire path 14, and an echo signal which is undesirably coupled via the hybrid circuit and corresponds to the signal R attenuated by the echo return loss ERL, are coupled from the hybrid circuit 16 as a signal S via an incoming part of the four-wire transmit path to a positive input of the subtraction unit 20. A negative, or subtraction, input of the subtraction unit is supplied with an output of the adaptive filter 18, and an output of the subtraction unit 20 is coupled as a signal T to an outgoing part of the four-wire transmit path for transmission to the far end of the four-wire path. When enabled by the control unit 19, the adaptive filter 18 is adapted, i.e. filter coefficients therein are updated, in dependence upon a residual echo signal which is fed back to the adaptive filter from the output of the subtraction unit 20, in a manner which is intended to maximize the echo return loss enhancement ERLE provided by the echo cancelling arrangement Maximizing the ERLE also maximizes the combined attenuation Acom of a far end signal from the receive path 10 to the transmit path 12 due to the ERL and the ERLE.

As explained in the introduction, adaptation of the adaptive filter 18 must be avoided when there is a near end signal present, because such a signal constitutes noise as far as the convergence of the echo canceller is concerned. Usually a double-talk detector is used to detect a near end signal and to inhibit adaptation of the adaptive filter if the average level of the signal S on the incoming part of the four-wire transmit path exceeds the average level of the signal R on the four-wire receive path minus the ERL. Thus it is usual for adaptation of the adaptive filter 10 to be enabled except when a near end signal is detected by the double-talk detector, so that the echo canceller can re-converge in response to any echo path changes which may occur.

The present echo canceller arrangement departs from this usual arrangement in that, after initial convergence of the echo canceller, adaptation of the adaptive filter 18 is inhibited and is only enabled again by the control unit 19 in response to an echo path change being detected in the absence of a near end signal. This difference is based on a recognition that changes in the impulse response of the echo path are relatively rare compared with the frequency of double-talk situations, which typically occur for about 20% of the time during telephone calls. To this end, the control unit 19 is supplied with a value Ac and a signal EPC which are described below.

Thus in the present echo canceller arrangement, when a call or telephone connection is initially established, adaptation of the adaptive filter 18 is enabled by the control unit 19 until the echo canceller has converged to a desired extent in which the echoes are substantially eliminated. The control unit 19 then inhibits adaptation of the adaptive filter 18, i.e. the filter coefficients are frozen, unless and until a change in the echo path is detected as described below. This prevents any change in the filter coefficients, and resulting divergence and re-convergence of the echo canceller with consequent audible echo bursts or convergence noise as in the prior art, in response to the starting and ending of double-talk situations which may commonly occur. If a change in the echo path is detected, then adaptation of the adaptive filter 18 is again permitted until the echo canceller has again converged to the desired extent, when the filter coefficients are again frozen.

As is well known, the extent to which the echo canceller has converged can be determined by monitoring either of the two echo attenuation parameters of the echo cancelling arrangement already referred to, namely the combined attenuation Acorn or the ERLE. In this preferred embodiment of the invention, the value Ac which is supplied to the control unit 19 represents the combined attenuation Acorn as described below. On initial establishment of a call or telephone connection, the control unit 19 enables adaptation of the adaptive filter 18 only until the value Ac is greater than a predetermined amount, corresponding to convergence of the echo canceller to a predetermined extent.

A change in either the combined attenuation Acorn or the ERLE can be used to determine a degradation in echo cancellation; however, it is necessary to distinguish between a change corresponding to a degradation in echo cancellation due to a change in the echo path response, and a change due to double-talk situations. The remaining parts of the arrangement as shown in FIG. 1 serve to provide the signal EPC which reliably represents an echo path change, as distinct from a double-talk situation, and which is used to enable adaptation of the adaptive filter 18 after its coefficients have been frozen. In the preferred embodiment of the invention shown in FIG. 1, the signal EPC is produced in dependence upon variation in the ERLE when the combined attenuation Acorn is less than a threshold value and in the absence of a near end signal as detected by a conventional double-talk detector.

As shown in FIG. 1, the levels of the signals R, S, and T are averaged by averagers 22, 24, and 26 respectively to produce average signal levels Ra, Sa, and Ta respectively. A calculator 28 calculates the value of the combined attenuation Acorn, which constitutes the value Ac, from the average signal levels Ra and Ta in accordance with the equation Ac=Ra/Ta. The calculated value Ac is supplied to the control unit 19 as described above, and is also supplied to a comparator 30 which compares the value Ac with a first threshold value At, and produces a control signal Cs in the event that Ac<At. The threshold value At represents a value of combined attenuation Acorn which corresponds to non-convergence of the echo canceller, or to a double-talk situation.

Another calculator 32 calculates the value Ea of the ERLE from the average signal levels Sa and Ta in accordance with the equation Ea=Sa/Ta. A further calculator 34 produces, as described further below, a value Ve which represents variation of the value Ea of the ERLE. A comparator 36 compares this value Ve with a second threshold value Vt, and produces a control signal Vc in the event that Ve<Vt. In the presence of both of the signals Cs and Vc, a counter 38 is incremented to produce the signal EPC in response to a predetermined maximum count being reached.

A conventional near end signal or double-talk detector (NE/DT DET.) 39 is supplied with the average signal levels Ra and Sa and with a minimum value Em of the ERL, for example representing a minimum ERL value of 6 dB, and produces an output signal when Sa>Ra−Em (or equivalently, when the difference Ra−Sa is less than the predetermined minimum value Em), and hence when there can be no doubt that a near end signal is present. This output signal is used to reset the count of the counter 38 to zero in the presence of a near end signal. The detector 39 and its output signal are provided to ensure that, in the presence of a strong near end signal when the calculated value Ea is very small so that its variation Ve is also small, a false incrementing of the counter 38 and consequent determination of an echo path change is avoided. A relatively slow operation of the detector 39 is not a problem, because it is used to reset the count of the counter 38 which is itself only incremented slowly.

The averagers 22, 24, and 26 produce relatively short-term averages of the respective signal levels, representing the signal envelopes or signal powers of the respective signals. The combined attenuation Acorn value Ac calculated by the calculator 28 and the ERLE value Ea calculated by the calculator 32 are also relatively short-term averages, because they are ratios of the short-term averages Ra, Sa and Ta. The values Ac and Ea are dependent upon the level of any near end signal which may be present. In the presence of a near end signal at a sufficient level, these values Ac and Ea are relatively small because components of the near end signal are not subtracted by the subtraction unit 20. In the absence of a near end signal, or the presence of a near end signal at a very low level, the values Ac and Ea are relatively large (after initial convergence of the echo canceller) because most or all of the transmit path signal S is constituted by the echo signal.

In the arrangement of FIG. 1, the comparator 30 produces the signal Cs when the value Ac is below the threshold value At, and hence at times when there is a relatively low combined attenuation Acorn and ERLE. This can be due either to an echo path change or, more commonly, to the presence of a near end signal such as in a double-talk situation.

By way of example, all of the units 18 to 39 of the echo cancelling arrangement can be incorporated as functions of a digital signal processor. The signals R, S, and T can be sampled at a sampling frequency of 8 kHz, and the samples of each signal can be exponentially averaged by the respective averager 22, 24, or 26 all in a similar manner. For example, the averager 24 can operate in accordance with the equation:

$$Sa(n)=\alpha S(n)+(1-\alpha)Sa\ (n-1)$$

where S(n) represents a sample at the current instant n, Sa(n) represents the average Sa for the current instant n, Sa(n−1) represents the average Sa for the previous instant n−1, and α is an exponential averaging constant. The value of α is not critical; for example $\alpha=2^{-7}$. The averager 26 can operate on the signal T in a similar manner with the same constant. The averager 22 can operate on the signal R in a similar manner also with the same constant, but in known manner may also take into account a fixed delay for the echo path (or for the loudest echo if there is more than one echo). Thus the averager 22 can more generally operate in accordance with the equation:

$$Ra(n-k)=\alpha R(n-k)+(1-\alpha)Ra(n-k-1)$$

where k represents the delay, in sampling periods, of the (loudest) echo path . The value of k is determined using a known delay estimation technique, such as cross correlation of the signals R and S.

The functions of the units 28 to 39 can be carried out at a much slower rate, for example at instants. m occurring once every 24 ms.

As described above, the calculator 32 calculates the value Ea of the ERLE from the average signal levels Sa and Ta in accordance with the equation $$Ea=Sa/Ta$$

or, more precisely, in accordance with the equation:

$$Ea(m)=Sa(m)/Ta(m)$$

where Ea(m), Sa(m), and Ta(m) are the values of Ea, Sa, and Ta respectively at the current instant m. The current value Ea(m) and a plurality p of immediately preceding and stored values Ea(m-1) to Ea(m-p) are used by the calculator 34 to determine the variation value Ve in accordance with the equations:

$$E\ max=max\{Ea(m),Ea(m-1),\ldots,Ea(m-p)\}$$

$$E\ min=min\{Ea(m),Ea(m-1),\ldots,Ea(m-p)\}$$

$$Ve=20\log_{10}(E\ max/Emin)$$

where max {. . .} represents the maximum of the values within the braces and min {. . . } represents the minimum of the values within the braces.

Thus the value Ve is a measure of the variation of the value Ea of the ERLE over an interval of p 24 ms periods. The value of p is not critical; for example p is in a range from 5 to 10, corresponding to a period of 120 to 240 ms. While other calculations could be performed to determine such a variation measure, for example a true statistical variance determination, a particularly accurate measurement is not required and the equations above allow for easy determination of a useful value Ve. As can be seen from the above equations, this is determined as the ratio, in decibels, of the maximum to the minimum value of Ea during the relevant interval.

The value Ve is used to enable a distinction to be made, between an echo path change and a double-talk situation, when the signal Cs is produced as a result of the value Ac being below the threshold value At as described above. In the event of an echo path change, the echo cancellation deteriorates but there is still a close correlation between the envelopes of the signals S and T. Consequently, there is a relatively small variation in the value Ea of the ERLE, and thus the variation value Ve is relatively small, typically being less than about 3 to 6 dB. Conversely, in the event of a double-talk situation there is little correlation between the signals S and T, so that the variation of the value Ea of the ERLE will be relatively large. Consequently, the variation value Ve is relatively large, typically being much more than about 3 to 6 dB.

The threshold Vt is set for example to this value of about 3 to 6 dB, and the comparator 36 compares the variation value Ve with this threshold Vt and produces a variation control signal Vc in the event that Ve<Vt, i.e. when the variation value Ve is consistent with an echo path change rather than a double-talk situation.

The counter 38 is supplied with the signals Cs and Vc, and is incremented once every 24 ms period when both of these signals are present, and otherwise is reset to a zero count. In response to the counter 38 reaching the predetermined maximum count, for example a count of 10 representing a period of 240 ms during which both of the signals Cs and Vc are present to represent a change in the echo path, the counter produces the signal EPC. As explained above, the detector 39 serves to reset the count of the counter 39 in the presence of a strong near end signal, so that the signal EPC can not be produced in this situation.

As already described above, in response to the signal EPC the control unit 19 again enables adaptation of the adaptive filter 18, until the echo canceller has again converged, whereupon the adaptive filter coefficients are again frozen and monitoring for a subsequent echo path change is resumed as described above.

Although as described above the value of the combined attenuation Acorn is used to constitute the signal Ac supplied to the control unit 19 and to the comparator 30, the value Ea of the ERLE could instead be used to constitute the signal Ac and/or could be supplied to the comparator 30 for comparison with an ERLE threshold value. In addition, or instead, although as described above variation of the value Ea of the ERLE is calculated in the calculator 34 and used to enable a distinction to be made between an echo path change and a double-talk situation, variation of the value of the combined attenuation Acorn could instead be calculated in a similar manner by the calculator 34 and used to enable this distinction to be made. Because the combined attenuation Acorn is equal to the sum of the ERL and the ERLE, there is a correlation between these two echo attenuation parameters, dependent upon the ERL and hence upon the characteristics of the hybrid circuit 16, which enables the parameters to be used to some extent interchangeably.

Figure 2:
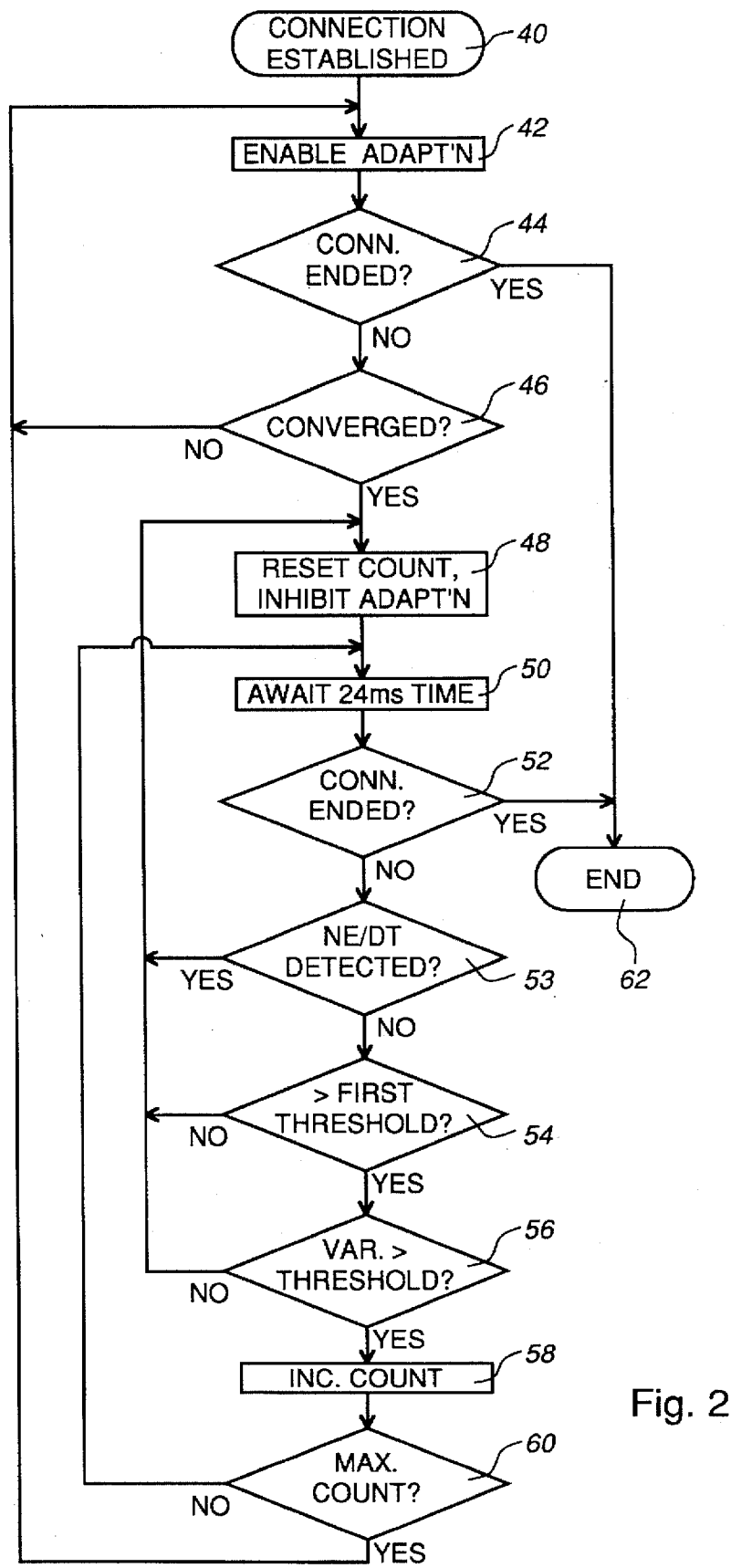
FIG. 2 is a flow chart illustrating aspects of the operation of the echo cancelling arrangement.

FIG. 2 illustrates; in a flow chart with blocks 40 to 62, steps associated with operation of the echo cancelling arrangement.

Referring to FIG. 2, on establishment of a connection at the block 40, adaptation of the adaptive filter 18 is enabled at the block 42 and this adaptation is continued in a loop back to the block 42 until either the connection is ended as determined at the block 44, in which case a branch is made to the end block 62, or the adaptive filter has converged to a predetermined desired extent as determined at the block 46, in which case the counter 38 is reset to zero and further adaptation of the adaptive filter is inhibited at the block 48. As described above, the convergence of the echo canceller is monitored by the control unit 19 by monitoring either of the echo attenuation parameters, namely the combined attenuation Acorn, as shown in FIG. 1, or the ERLE.

From the block 48, there is a wait at the block 50 for the next update time, every 24 ms as described above, and unless the connection has ended as determined at the block 52 (in which case the process is again ended at the end block 62) it is determined at the block 53 whether a near end signal is present as detected by the NE/DT detector 39 as described above. If so, there is a loop back to the block 48, resetting the count of the counter 38, with adaptation of the adaptive filter remaining inhibited. Otherwise, a selected one of the two echo attenuation parameters is compared with the first threshold value at the block 54. As described above, this is a comparison of the combined attenuation value AC with the threshold value At in the comparator 30. If the selected echo attenuation parameter is not less than the first threshold, there is a loop back to the block 48, the count of the counter 38 being reset and adaptation of the adaptive filter remaining inhibited. If the selected echo attenuation parameter is less than the first threshold, then in the block 56 the calculated variation of a selected (same or different) one of the two echo attenuation parameters is compared with the second threshold value. As described above, the variation Ve of the ERLE is calculated in the calculator 34 and is compared with the second threshold value Vt in the comparator 36.

If this variation is not less than the second threshold as determined at the block 56, there is again a loop back to the block 48, the counter 38 being reset and adaptation of the adaptive filter remaining inhibited. If the variation is less than the second threshold, the counter 38 is incremented at the block 58. At the block 60 it is determined whether the maximum count (e.g. 10 as described above) has been reached; if not there is a return to the block 50 to wait for the next update time, and adaptation of the adaptive filter remains inhibited but the counter is not reset. If the maximum count has been reached, there is a return to the block 42, it being concluded that there has been an echo path change and adaptation of the adaptive filter again being enabled to achieve reconvergence accordingly.

In addition to the alternatives already discussed, as already indicated above the variation value Ve can be produced in other ways, and it can be appreciated that this value, in the presence of the signal Cs, can also be used to provide an indication of double-talk situations, thereby supplementing or replacing a conventional double-talk detector. In addition, different predetermined counts can be used in the counter 38 for producing the signal EPC.

Thus although particular embodiments of the invention have been described in detail, it should be appreciated that numerous modifications, variations, and adaptations may be made without departing from the scope of the invention as defined in the claims.

What is claimed is:

1. A method of detecting echo path changes in an echo cancelling arrangement in which an estimated echo signal is produced from a receive path signal and is subtracted from an incoming transmit path signal to produce an outgoing transmit path signal, comprising the steps of:

monitoring signal levels on said paths;

determining from the monitored signal levels when a first echo attenuation parameter of the echo cancelling arrangement is less than a first threshold value;

determining from the monitored signal levels when a variation of a second echo attenuation parameter of the echo cancelling arrangement is less than a second threshold value; and detecting that an echo path has changed in response to determinations that the first echo attenuation parameter is less than the first threshold value and that the variation of the second echo attenuation parameter is less than the second threshold value.

2. A method as claimed in claim 1 wherein at least one of the first and second echo attenuation parameters comprises combined attenuation from the receive path to the outgoing transmit path and is determined from the monitored signal levels on the receive path and the outgoing transmit path.

3. A method as claimed in claim 1 wherein at least one of the first and second echo attenuation parameters comprises ERLE (echo return loss enhancement) due to the subtraction of the estimated echo signal and is determined from the monitored signal levels on the incoming and outgoing transmit paths.

4. A method as claimed in claim 1 wherein one of the first and second echo attenuation parameters comprises combined attenuation from the receive path to the outgoing transmit path and the other of the first and second echo attenuation parameters comprises ERLE (echo return loss enhancement) due to the subtraction of the estimated echo signal.

5. A method as claimed in claim 1 wherein the first echo attenuation parameter comprises combined attenuation from the receive path to the outgoing transmit path and the second echo attenuation parameter comprises ERLE (echo return loss enhancement) due to the subtraction of the estimated echo signal.

6. A method as claimed in claim 5 wherein the step of determining from the monitored signal levels when a variation of the ERLE is less than a second threshold value comprises forming a ratio of a maximum value to a minimum value of the ERLE.

7. A method as claimed in claim 5 wherein the step of monitoring signal levels on said paths includes averaging signal levels on the receive path and the incoming and outgoing transmit paths.

8. A method as claimed in claim 1 wherein the step of determining from the monitored signal levels when a variation of the second echo attenuation parameter is less than a second threshold value comprises forming a ratio of a maximum value to a minimum value of the second echo attenuation parameter.

9. A method as claimed in claim 1 wherein the step of monitoring signal levels on said paths includes averaging signal levels on the receive path and the incoming and outgoing transmit paths.

10. A method as claimed in claim 1 and further comprising the step of inhibiting detection that an echo path has changed in response to a difference between the monitored signal levels on the receive and incoming transmit paths being less than a predetermined amount.

11. A method of controlling an echo cancelling arrangement in which an estimated echo signal is produced by an adaptive filter from a signal on a receive path and is subtracted from a signal on an incoming transmit path to produce a signal on an outgoing transmit path, comprising the steps of:

monitoring convergence of the echo canceller;

inhibiting adaptation of the adaptive filter in response to convergence of the echo canceller to a predetermined extent; and subsequently enabling adaptation of the adaptive filter in response to a first echo attenuation parameter of the echo cancelling arrangement being less than a first threshold value and a variation of a second echo attenuation parameter of the echo cancelling arrangement being less than a second threshold value.

12. A method as claimed in claim 11 wherein at least one of the first and second echo attenuation parameters comprises combined attenuation from the receive path to the outgoing transmit path.

13. A method as claimed in claim 11 wherein at least one of the first and second echo attenuation parameters comprises ERLE (echo return loss enhancement) due to the subtraction of the estimated echo signal.

14. A method as claimed in claim 11 wherein one of the first and second echo attenuation parameters comprises combined attenuation from the receive path to the outgoing transmit path and the other of the first and second echo attenuation parameters comprises ERLE (echo return loss enhancement) due to the subtraction of the estimated echo signal.

15. A method as claimed in claim 11 wherein the first echo attenuation parameter comprises combined attenuation from the receive path to the outgoing transmit path and the second echo attenuation parameter comprises ERLE (echo return loss enhancement) due to the subtraction of the estimated echo signal.

16. A method as claimed in claim 15 wherein the variation of the ERLE is determined by forming a ratio of a maximum value to a minimum value of the ERLE.

17. A method as claimed in claim 11 wherein the variation of the second echo attenuation parameter is determined by forming a ratio of a maximum value to a minimum value of the second echo attenuation parameter.

18. A method as claimed in claim 11 and including the step of averaging signal levels on said paths to provide averaged signal levels for use in determining the first and second echo attenuation parameters.

19. A method as claimed in claim 11 and further comprising the step of inhibiting the step of subsequently enabling adaptation of the adaptive filter in response to a difference between the signal levels on the receive and incoming transmit paths being less than a predetermined amount.

20. An echo cancelling arrangement for coupling to a four-wire communications path which is coupled via a hybrid circuit to a two-wire communications path, for cancelling an echo signal coupled via the hybrid circuit from a receive path of the four-wire path to a transmit path of the four-wire path, the arrangement comprising:

an adaptive filter having an input coupled to the receive path and an output for an estimated echo signal;

a subtraction unit in the transmit path for subtracting the estimated echo signal from a signal on the transmit path; and apparatus for determining variation of a ratio, of signal levels on the receive path or the transmit path before the subtraction unit to signal levels on the transmit path after the subtraction unit, and for comparing the variation with a threshold value for use in controlling adaptation of the adaptive filter.

21. An echo cancelling arrangement as claimed in claim 20 and including:

averaging apparatus for producing averages Ra, Sa, and Ta of signal levels on the receive path and on the transmit path before and after the subtraction unit, respectively;

apparatus for determining at least one of ratios Sa/Ta and Ra/Ta; and apparatus for inhibiting adaptation of the adaptive filter in response to one of said ratios being greater than a predetermined amount:

wherein the apparatus for determining and for comparing the variation is arranged for enabling adaptation of the adaptive filter in response to one of said ratios being less than a first threshold value and the variation of one of said ratios being less than a second threshold value.

22. An echo cancelling arrangement as claimed in claim 21 and including a detector for inhibiting adaptation of the adaptive filter in response to a difference between the signal levels on the receive path and on the transmit path before the subtraction unit being less than a predetermined amount.

23. An echo cancelling arrangement as claimed in claim 21 wherein the apparatus for determining variation comprises apparatus for forming a ratio of a maximum value to a minimum value of one of said ratios for comparison with the second threshold value.

24. An echo cancelling arrangement as claimed in claim 21 wherein the ratio determining apparatus is arranged to determine both of the ratios Ra/Ta and Sa/Ta, and the apparatus for determining and for comparing the variation is arranged for enabling adaptation of the adaptive filter in response to a first one of said ratios being less than the first threshold value and variation of the other of said ratios being less than the second threshold value.

25. An echo cancelling arrangement as claimed in claim 24 wherein the first one of said ratios is the ratio Ra/Ta.

26. An echo cancelling arrangement as claimed in claim 20 wherein the apparatus for determining variation of a ratio is arranged to determine variation of a ratio of signal levels on the receive path to signal levels on the transmit path after the subtraction unit.

27. An echo cancelling arrangement as claimed in claim 20 and including a detector for inhibiting adaptation of the adaptive filter in response to a difference between the signal levels on the receive path and on the transmit path before the subtraction unit being less than a predetermined amount.

* * * * *